C. F. WRAY.
VALVE LUBRICATING MEANS.
APPLICATION FILED SEPT. 9, 1915.

1,187,592.

Patented June 20, 1916.

WITNESS

INVENTOR
Charles F. Wray
BY
his ATTORNEYS

UNITED STATES PATENT OFFICE.

CHARLES F. WRAY, OF ROCHESTER, NEW YORK, ASSIGNOR TO THE NATIONAL BRASS MANUFACTURING COMPANY, OF ROCHESTER, NEW YORK, A CORPORATION OF NEW YORK.

VALVE-LUBRICATING MEANS.

1,187,592.  Specification of Letters Patent.  Patented June 20, 1916.

Original application filed February 8, 1913, Serial No. 747,059. Divided and this application filed September 9, 1915. Serial No. 49,822.

*To all whom it may concern:*

Be it known that I, CHARLES F. WRAY, of Rochester, in the county of Monroe and State of New York, have invented certain new and useful Improvements in Valve-Lubricating Means; and I do hereby declare the following to be a full, clear, and exact description of the same, reference being had to the accompanying drawings, forming a part of this specification, and to the reference-numerals marked thereon.

My present invention has for its purpose to afford a novel and improved lubricating means for valves or faucets, with more particular reference to the type which employs a rotary plug that is movable within a correspondingly formed valve body, the present application being a division of my original application, Serial No. 747,059, filed February 8, 1913.

More specifically the invention has for its object to afford continuous lubrication in a valve of this character, so as to effect more ready action in opening and closing, and at the same time making provision for preventing the lubricant from coming into contact with the liquid that passes through the valve as it is drawn from the receptacle or pipe to the point of discharge.

To these and other ends the invention consists in certain improvements and combinations of parts all as will be hereinafter more fully described, the novel features being pointed out in the claims at the end of the specification.

Figure 1:
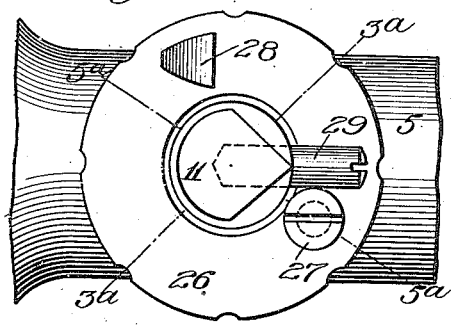
Figure 2:
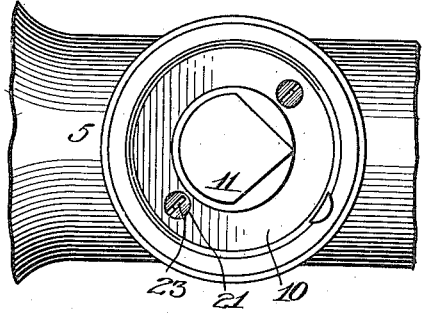
Figure 4:
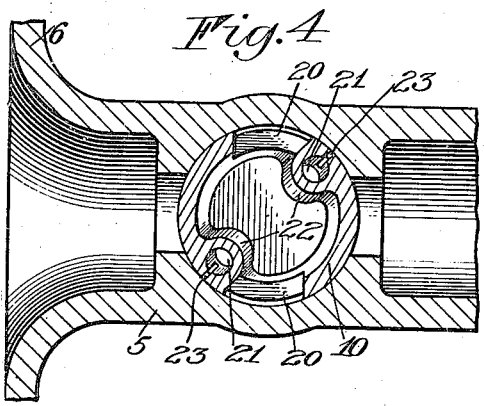
Figure 3:
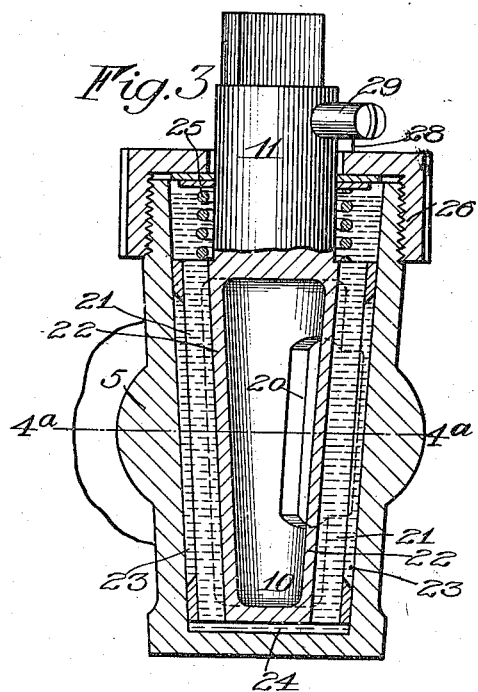
Figure 5:
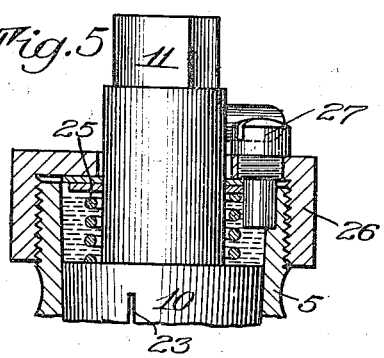

In the drawings: Figure 1 is a plan view of a faucet, with the handle removed, showing the application of the invention; Fig. 2 is a plan view with the cap and spring removed; Fig. 3 is a vertical sectional view on the line 3ª—3ª of Fig. 1; Fig. 4 is a sectional view on the line 4ª—4ª of Fig. 3, and Fig. 5 is a sectional view on the line 5ª—5ª of Fig. 1.

Similar reference numerals in the several figures indicate the same parts.

In the present embodiment of the invention, 5 designates the valve body within which is arranged the rotary plug or valve 10 carrying a valve stem 11 which may be rotated by any suitable handle or other operating means to effect opening and closing of the valve.

The valve 10 is preferably tapered and hollow, being provided with ports 20 and arranged between the ports 20 are lubricant chambers or openings 21 extending lengthwise of the valve, the walls of which are provided with enlarged portions 22 for this purpose. The lubricant chambers 21 are connected with the periphery of the valve by means of restricted openings or slots 23, while the vertical chambers 21 are connected at the bottom of the valve by a passage 24.

25 is a spring surrounding the valve stem 20 and acting to hold the valve in proper relation in the body, the spring being retained in engagement with the valve by means of the cover 26 which is threaded upon the upper end of the body 5. The cover 26 is provided with a threaded opening to receive a screw plug 27 which engages a recess formed in the valve body, and serves to retain the cap in proper relation to the valve body, and to limit the movement of the valve in one direction. Operation of the valve is limited by a stop 29 carried by the valve stem and acting to engage the aforementioned screw plug 27 when moved in one direction, and a projection 28 when moved in the opposite direction, whereby the opening and closing movements of the valve plug are accurately fixed.

After the valve is positioned within the body the lubricant is poured in, entirely filling the chambers 21 and also the portion of the valve body located above said chambers. The lubricating material passes out through the narrow opening 23, and thus comes in contact with the walls of the valve body which are constantly and thoroughly supplied with a proper amount of lubrication by reason of the fact that the discharges for the lubricating material extend lengthwise of the valve plug to points adjacent its opposite ends, so that substantially the entire surface of the valve body with which the plug comes in contact is supplied with a practically constant and even supply of lubricating material. At the same time, there is no chance for a surplus of lubricating material to find an exit, or for any of it to come in contact with the fluid passing through the valve, as the discharge openings for the lubricant are so constructed and arranged as to permit just enough of the lubricating material to pass therethrough to properly lubricate the wall of the valve body and to prevent any of the lubricant from being taken up by the fluid which the valve is arranged to control.

I claim as my invention:

1. The combination with a valve body, of a rotary plug arranged therein and provided with a lubricant chamber extending longitudinally of the plug and connected with its periphery by a restricted passage substantially coextensive with the plug.

2. The combination with a valve body, of a rotary plug arranged therein provided with lubricant chambers extending longitudinally of the plug and coextensive therewith, and connected with the periphery of the plug by means of restricted passages extending longitudinally to points adjacent to the ends of the plug.

CHARLES F. WRAY.

Witnesses:
H. E. STONEBRAKER,
M. MADELINE MILLER.